United States Patent
Gonidec et al.

[19]

[11] Patent Number: 5,913,476
[45] Date of Patent: *Jun. 22, 1999

[54] TURBOJET ENGINE THRUST REVERSER HAVING HINGED DOORS

[75] Inventors: Patrick Gonidec, Sainte Adresse; Guy Bernard Vauchel, Le Havre, both of France

[73] Assignee: Societe Hispano-Suiza, Colombes Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/758,141

[22] Filed: Nov. 25, 1996

[30] Foreign Application Priority Data

Nov. 30, 1995 [FR] France ................... 95 14137

[51] Int. Cl.$^6$ ........................................ F02K 1/54
[52] U.S. Cl. ..................... 239/265.31; 60/226.2
[58] Field of Search ................. 60/226.2, 230; 239/265.25, 265.29, 265.31

[56] References Cited

U.S. PATENT DOCUMENTS

| | | |
|---|---|---|
| 3,279,182 | 10/1966 | Helmintoller . |
| 3,570,767 | 3/1971 | Lawson et al. ............ 239/265.29 |
| 3,603,090 | 9/1971 | Billinger et al. ............ 60/226.2 |
| 3,605,411 | 9/1971 | Maison et al. . |
| 4,030,291 | 6/1977 | Sargisson ............ 239/265.31 |
| 4,040,682 | 8/1977 | Brownhill ............ 239/265.31 |
| 4,557,441 | 12/1985 | Aspinall . |
| 4,894,985 | 1/1990 | Dubois et al. . |
| 4,960,243 | 10/1990 | Dubois et al. . |
| 5,039,171 | 8/1991 | Lore . |
| 5,243,817 | 9/1993 | Matthias . |
| 5,267,438 | 12/1993 | Bunel et al. . |
| 5,297,387 | 3/1994 | Carimali et al. . |

FOREIGN PATENT DOCUMENTS

| 2030034 | of 1970 | France . |
|---|---|---|
| WO 93/16279 | of 1993 | WIPO . |

*Primary Examiner*—Louis J. Casaregola
*Attorney, Agent, or Firm*—Bacon & Thomas, PLLC

[57] ABSTRACT

A thrust reverser is disclosed for a turbojet engine having a cowling forming an outer boundary of a gas flow duct through which pressurized gases flow, the cowling having a reverse thrust opening, in which the thrust reverser comprises a thrust reverser door assembly pivotally attached to the cowling so as to be movable between a forward thrust position in which the thrust reverser door assembly covers the reverse thrust opening through the cowling, and a reverse thrust position in which the thrust reverser door assembly directs at least a portion of the gases flowing through the gas flow duct through the reverse thrust cowling opening. The thrust reverser door has a front door having a first rear edge portion and a first inner surface forming a portion of the outer boundary of the gas flow duct when the thrust reverser door assembly is in the forward thrust position, and a rear door having a front edge portion pivotally attached to the rear edge portion of the front door and a second inner surface forming a portion of the outer boundary of the gas flow duct when the thrust reverser assembly is in the forward thrust position such that the resultant force of the pressurized gases acting on the first and second inner surfaces urge the thrust reverser door assembly toward its forward thrust position.

12 Claims, 4 Drawing Sheets

TURBOJET ENGINE THRUST REVERSER HAVING HINGED DOORS

BACKGROUND OF THE INVENTION

The present invention relates to a thrust reverser for a tubojet engine in which pivotable thrust reverser doors have hinged front and rear door portions.

Turbofan-type turbojet engines are well-known in the art and typically comprise an annular cowling concentrically arranged around the turbojet engine housing to form an annular cold flow air duct. A fan driven by the turbojet engine is located in the forward portion of the cold flow air duct to force air through the duct and to augment the thrust of the turbojet engine. The cold flow air duct may extend substantially along the length of the turbojet engine in which case the downstream or rear portion of the cowling acts as an outer boundary for both the cold flow air and the hot exhaust gases from the turbojet engine, or, alternatively, the cowling forming the outer boundary of the cold flow duct may be significantly shorter than the overall length of turbojet engine. It is known in the art to provide pivoting thrust reverser doors on the cowling forming the outer boundary of the cold flow air duct. If the turbojet engine is located externally of an aircraft, the outer surface of the cowling forms an aerodynamic surface to minimize the drag of the engine cowling.

FIG. 1 illustrates a typical prior art pivoting door type thrust reverser in cross-section, while FIG. 2 is a perspective representation of a cowling incorporating the known thrust reverser doors illustrated in FIG. 1. The cowling has a front cowling portion 1 and may have a rear cowling portion 3 which define between them an opening through the cowling which is normally blocked by a thrust reverser 2. The thrust reverser 2 comprises a door 7 pivotally attached to the cowling so as to be movable between forward thrust positions (illustrated in FIG. 1) and reverse thrust positions. The movement of the thrust reverser door 7 is controlled by actuator 8 which is attached to internal structure 6 of the cowling 1 and which has an extendible and retractable piston rod connected to the internal structure of the thrust reverser door 7. When in the forward thrust position, the thrust reverser door 7 has an outer surface 9 that is substantially flush with the outer surface of the cowling 1 and an inner surface 11 which forms a portion of the outer boundary of the cold flow gas duct. A deflector 13 may be attached to the front edge portion of the thrust reverser door 7 to impart a forward direction to the gases when the thrust reverser door 7 is in the reverse thrust position. As best illustrated in FIG. 2, the cowling 1 may have a plurality of thrust reverser doors 7 each pivotally attached to longitudinal portions 18 of the cowling which extend between adjacent doors. The longitudinally extending portions 18 of the cowling extend rearwardly from a front portion 4 of the cowling 1. The front portion of the inner surface 11 of the thrust reverser door 7 may be tapered so as to provide a more effective direction of the gases when in the reverse thrust position. However, when the thrust reverser door is in the forward thrust position, this surface may form a cavity 16 which will slightly degrade the efficiency of the engine by creating perturbations within the annular gas flow duct.

In the reverse thrust position, the front portion of the thrust reverser door 7 will move radially outwardly from the cowling 1 while the rear portion moves radially inwardly into the gas flow duct. The rear portion of the thrust reverser door 7 blocks at least a portion of the annular gas flow duct so as to redirect the gases outwardly through the cowling. The configuration of the inner surface 11 coupled with the deflector 13 impart to these gases a forward direction which provides a reverse thrust to the aircraft structure. Typical examples of such thrust reverses are illustrated in French Patents 1,482,538 and 2 030 034.

U.S. Pat. No. 3,605,411 illustrates a pivoting door thrust reversing system in which the forward deflector 13 is movably affixed to the thrust reverser door so as to extend therefrom when the door is in the reverse thrust position and to retract when the door is in the forward thrust position. Another example of a system incorporating movable deflectors can be found in French Patent 2 618 853. French Patent 2 680 547 illustrates a pivoting door thrust reverser system utilizing a combination of deflectors and deflection edges to optimize the gas flow direction when the thrust reverser door is in the reverse thrust position.

It is known to move the thrust reverser doors between the forward and reverse thrust positions using an actuator as illustrated in FIG. 1 and as illustrated in French Patent 1,482,538.

Although generally successful, the known pivoting door type thrust reversers have suffered from the drawback of being urged to their reverse thrust positions by the forces exerted on the inner surfaces of the doors by the pressurized gases within the gas flow duct. Although the known thrust reversers incorporate various locking and latching mechanisms to lock and latch the doors in their forward thrust positions, the failure or malfunction of such locking and latching systems may result in the doors being inadvertently deployed to their reverse thrust positions due to the action of the pressurized gases within the gas flow duct. The total cross-section of the openings through the cowling must be larger than the cross-section of the gas flow duct taken in a plane located upstream of the cowling openings. In accommodating the dimensions required of the thrust reverser doors the effect of the internal gas pressure on the doors is such that very high stresses are passed through the actuator requiring a strong actuator attachment which, in turn, increases the weight of the cowling assembly. The use of sufficiently heavy locking and latching systems also increase the weight of the engine assembly.

SUMMARY OF THE INVENTION

A thrust reverser is disclosed for a turbojet engine having a cowling forming an outer boundary of a gas flow duct through which pressurized gases flow, the cowling having a reverse thrust opening, in which the thrust reverser comprises a thrust reverser door assembly pivotally attached to the cowling so as to be movable between a forward thrust position in which the thrust reverser door assembly covers the reverse thrust opening through the cowling, and a reverse thrust position in which the thrust reverser door assembly directs at least a portion of the gases flowing through the gas flow duct through the reverse thrust cowling opening. The thrust reverser door has a front door having a first rear edge portion and a first inner surface forming a portion of the outer boundary of the gas flow duct when the thrust reverser door assembly is in the forward thrust position, and a rear door having a front edge portion pivotally attached to the rear edge portion of the front door and a second inner surface forming a portion of the outer boundary of the gas flow duct when the thrust reverser assembly is in the forward thrust position such that the resultant force of the pressurized gases acting on the first and second inner surfaces urge the thrust reverser door assembly toward its forward thrust position.

The thrust reverser according to the invention increases the safety of the device and reduces the weight of the assembly. Since the resultant force of the gases within the gas flow duct acting on the door assembly urge it toward the forward thrust position, the actuator, as well as the latching and locking mechanisms, are not subjected to the extreme forces as in the prior art devices and, therefore, may be made structurally lighter than the prior art devices without compromising safety. When in the forward thrust position, the resultant force acting on the inner surfaces of the front and rear doors by the gases flowing through the gas flow duct is located to the rear of the pivot axis of the door assembly, thereby urging it toward its forward thrust position. Movement of the thrust reverser door assembly to the reverse thrust position causes relative pivoting movement between the front and rear doors so as to achieve an effective reversal of the gas flow from the gas flow duct outwardly through the openings in the cowling.

DETAILED DESCRIPTION OF THE PREFERRED

Figure 1:
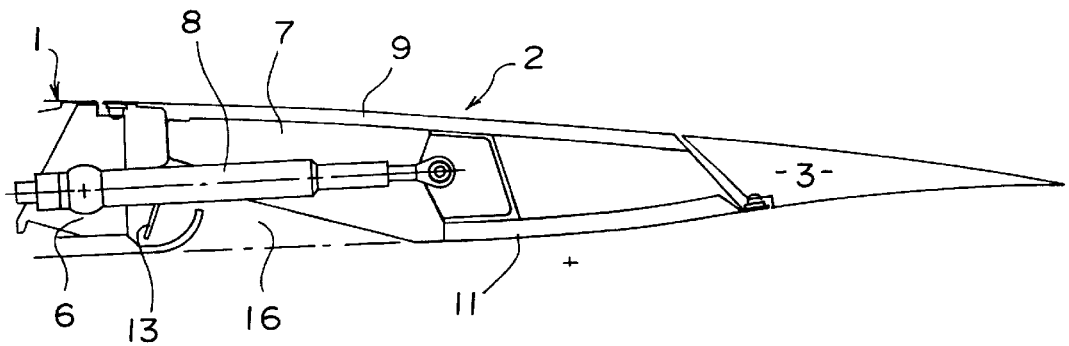
FIG. 1 is a partial, cross-sectional view of a known pivoting door type thrust reverser.
Figure 2:
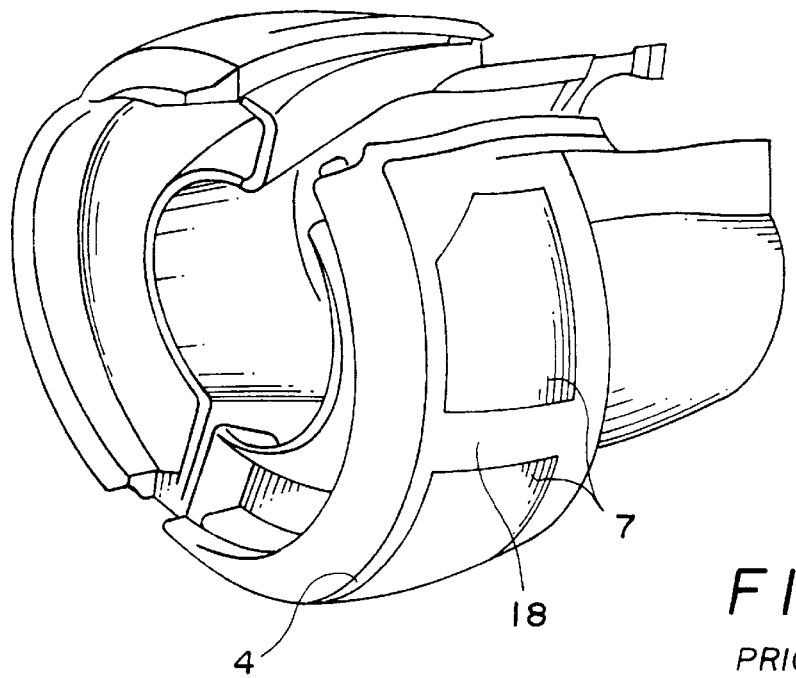
FIG. 2 is a perspective view of a turbojet engine cowling incorporating the known thrust reverser doors illustrated in FIG. 1.
Figure 3:
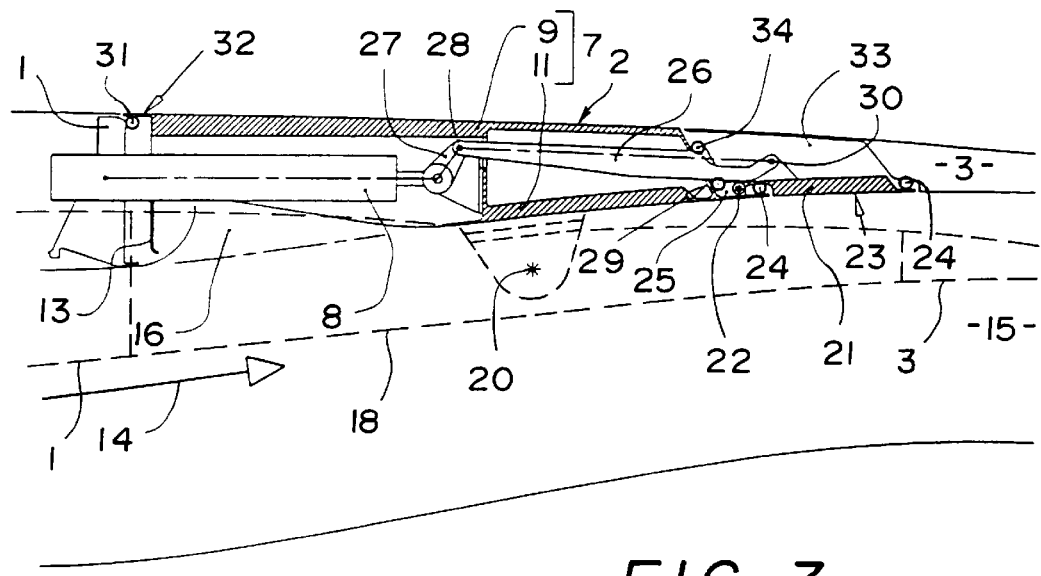
FIG. 3 is a partial, cross-sectional view of a first embodiment of the thrust reverser according to the present invention with the thrust reverser door assembly in the forward thrust position.

In the description of the embodiments of the present invention, the elements of the assembly having the same function as in the known prior art have been assigned the same identifying numerals. Thus, as can be seen in applicants' FIG. 3, the thrust reverser according to the present invention is again utilized with a cowling 1 having an upstream cowling portion, a downstream cowling portion 3 and an actuator 8 for moving the thrust reverser door assembly 2 between its forward thrust and is reverse thrust positions. The thrust reverser door assembly 2 comprises outer and inner panels 9 and 11 respectively. Outer panel 9 has an outer surface substantially flush with the outer surface of the cowling 1 inner panel 11 forms a portion of the outer boundary of the gas flow duct 15 when the thrust reverser door assembly 2 is in the forward thrust position as illustrated in FIG. 3. Gases flow from front to rear as illustrated by arrow 14. The thrust reverser door assembly 2 pivots about axis 20 when moving between the forward and reverse thrust positions illustrated in FIGS. 3 and 4.

According to the present invention, the thrust reverser door assembly 2 comprises a front door 7 which pivots about pivot axis 20. A rear door 21 has a front portion pivotally connected by pivot 22 to a rear edge portion of the front door 7. The rear door 21 has an inner surface 23 which, when the thrust reverser door assembly 2 is in the forward thrust position, forms a portion of the boundary of the gas flow duct 15. As can be seen in FIG. 3, the inner surface 23 is substantially flush with the inner surface of rear cowling portion 3 as well as the inner surface of front door 7 to form a smooth outer boundary for the gas flow duct 15. A seal 24 is located between the front door 7 and the rear door 21 to prevent passage therebetween of the pressurized gases within the gas flow duct 15. By preventing such flow, the pressure of the pressurized gases within the gas flow duct 15 are prevented from acting on the outer surface of the rear door 21 via chamber 33 which is at ambient pressure conditions.

Figure 4:
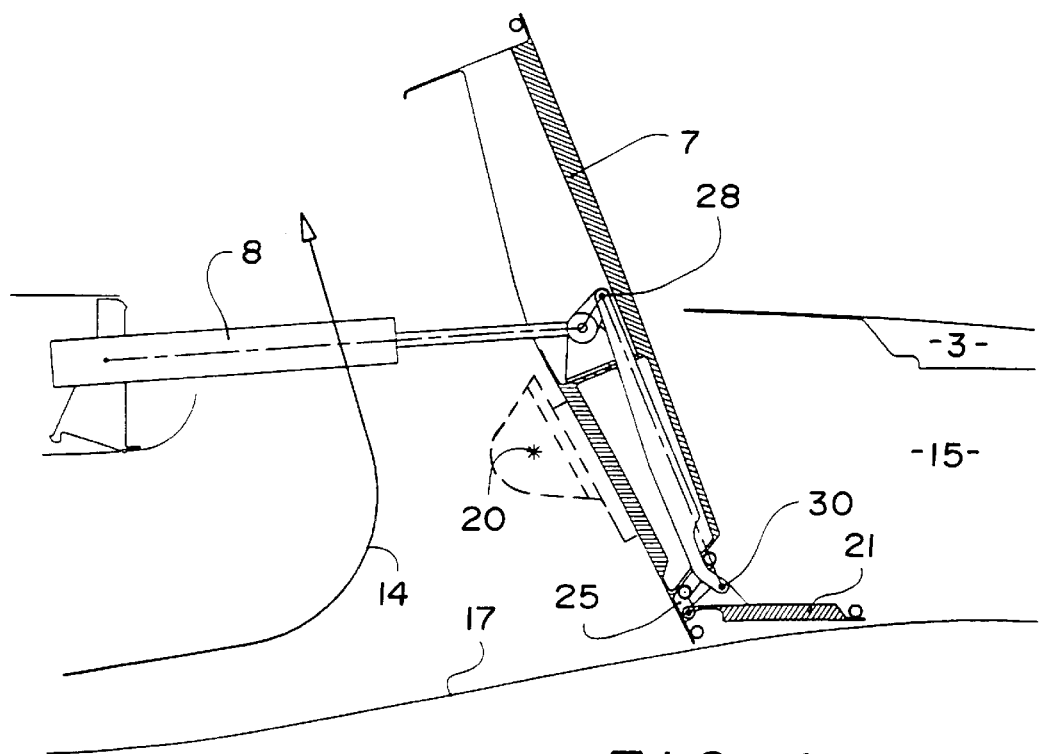
FIG. 4 is a partial, cross-sectional view illustrating the thrust reverser of FIG. 3 in the reverse thrust position.

Pivot 22 may be formed as part of a hinge assembly 25 attached to the downstream edge portion of the front door 7. Although the pivot 22 is illustrated in FIGS. 3 and 4 as being adjacent to the inner surface of the front door 21, it is to be understood that such pivot could also be located adjacent to the outer surfaces of the respective front and rear doors.

The thrust reverser door assembly is moved to the reverse thrust position by extending the piston rod of the actuator 8 by known control means. Such extension of the piston rod causes the front door 7 to pivot about axis 20 and, due to the mechanical interconnection between the front door 7 and the rear door 21, the rear door 21 pivots about axis 22 relative to the front door 7. The mechanical connection means between the front and rear doors may comprise a linkrod 26 pivotally attached to the rear door 21 by pivot 30 and connected to the front door 7 by connection 28.

The surface area and the shape of the rear door 21 are such that, in combination with the inner surface 11 of the front door 7, the resultant force acting on the thrust reverser door assembly by the pressurized gases within the duct 15 urge the thrust reverser door assembly 2 toward its forward thrust position to positively avoid unintended opening of the thrust reverser door assembly. The linkrod 26 passes through the rear edge of the front door 7 through an opening 29 and is connected to the rear door 21 by pivot 30. As illustrated in FIG. 4, the gas flow through the duct 15 is diverted in the direction of arrow 14 by the inner surface 11 of the front door 7 and the deflector 13 to generate a reverse thrust gas flow. The rear portion of the front door 7 cooperates with a wall 17 forming an inner boundary of the gas flow duct (which may constitute the turbojet engine housing) so as to redirect the gases through the opening in the cowling. As can be seen, the rear door 21 is pivoted relative to the front door 7 so as to enable the inner surface 11 of the front door 7 to efficiently redirect the gases in the reverse thrust direction.

Figure 7:
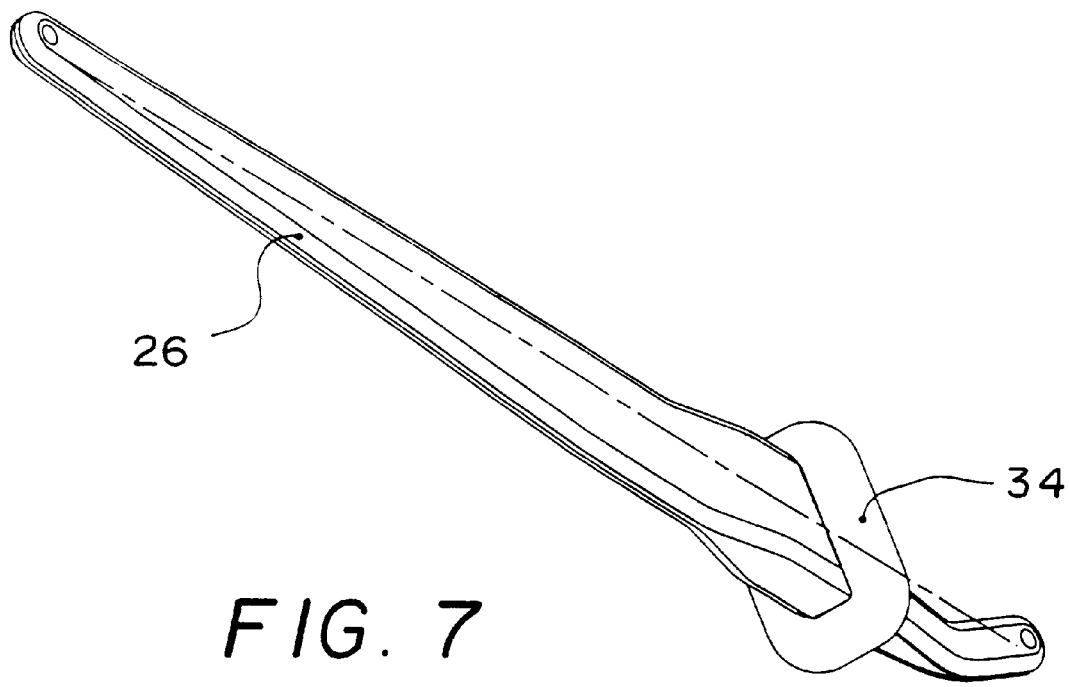
FIG. 7 is a perspective view of the link rod connecting the front and rear doors in a sealing position corresponding to FIG. 3.
Figure 8:
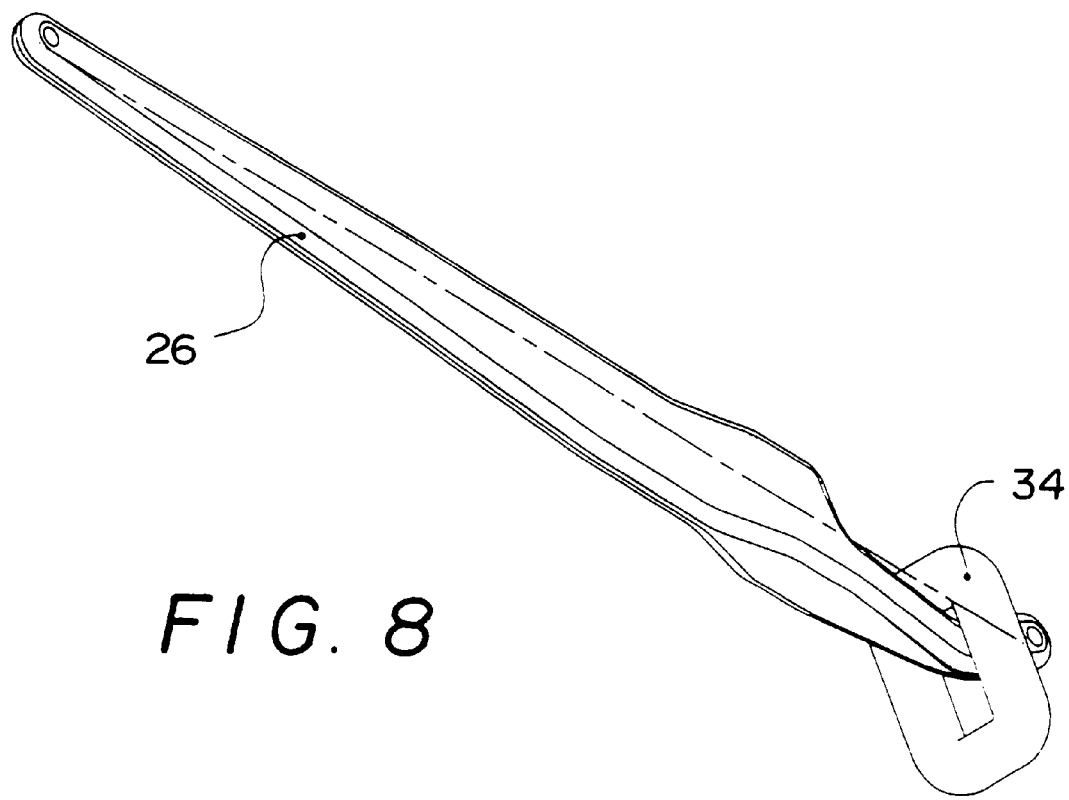
FIG. 8 is a perspective view of the link rod and seal of FIG. 7 illustrating these elements in their respect positions when the thrust reverser door assembly is in the reverse thrust position of FIG. 4.

A seal 31 is interposed between the front edge portion 32 of the front door 7 and the cowling 1 to seal this juncture when the thrust reverser door assembly is in the forward thrust position. Sealing of the front edge portion 32 of the front door 7 assures that the cavity 16 will be at the pressure of the gases flowing in the gas flow duct 15, this pressure also being sealed by seal 34 sealing against linkrod 36. This prevents the pressure of the gases within the gas flow duct 15 from entering chamber 33 and acting on the outer surface of the rear door 21. As illustrated in FIGS. 3 and 7, the linkrod 26 has an enlarged portion which is sealed by seal 34 when the door assembly is in the forward thrust position. When the thrust reverser door assembly moves to the reverse thrust position, relative movement between the linkrod 25 and the front door 7 enables the opening in the seal 34 to be uncovered allowing the pressurized gases within the gas flow duct 15 to act on both sides of the rear door 21 to thereby minimize the door assembly opening forces. During the transition into the reverse thrust position, the linkrod 26 will progressively loose contact with the seal 34 between the positions illustrated in FIG. 7 and FIG. 8. However, depending upon a particular application, the kinematics and the shape of the particular linkrod utilized may achieve a sealing contact with the seal 34 during all phases of door operation.

Instead of being situated downstream of the structure of the front door 7, as illustrated in FIG. 3, seal 34 may be situated anywhere within the structure as long as it is between the upstream connection 28 of the linkrod 26 and the rear edge portion of the front door 7. If the pivot 22 connecting the rear door 21 to the front door 7 is located adjacent to an outer surface of the front door 7, the mechanical drive means for the rear door 21 may be a thrust system necessitating a reversal of the aforementioned seating system.

The opening angle of the door assembly may, of course, be varied depending upon the particular application and the leaks between the rear edge portion of the front door 7 and the wall 17 may be designed to enhance gas flow performance during reverse thrust operation. The boundary between the rear portion of inner surface 11 of front door 7 and the front edge portion of rear door 21 may be displaced without thereby degrading the aerodynamic properties of the wall bounding the gas flow duct 15 when the door assembly is in the forward thrust position.

Depending upon the criteria for each specific application, the rear door 21 may be modified by forming it in:

a rectangular shape;

varying the orientations of the front and rear edges, and/or making the edges asymmetrical;

making the width of the rear door less than or equal to that of the front door; or, forming it from a single element, or multiple elements having overlapping portions to insure sealing.

The present invention may be combined with any known methods of improving the efficiency of the gas flow, in particular by using a movable panel such as described in U.S. Pat. No. 3,645,411, or an upstream panel described in European Patent 0 413 635. In the latter case, sealing provided between the front panel and the cowling thrust reverser opening allows the elimination of the seal 34 at the opening 29, since the rear chamber 33 and the cavity 16 will be at the same pressure.

Figure 5:
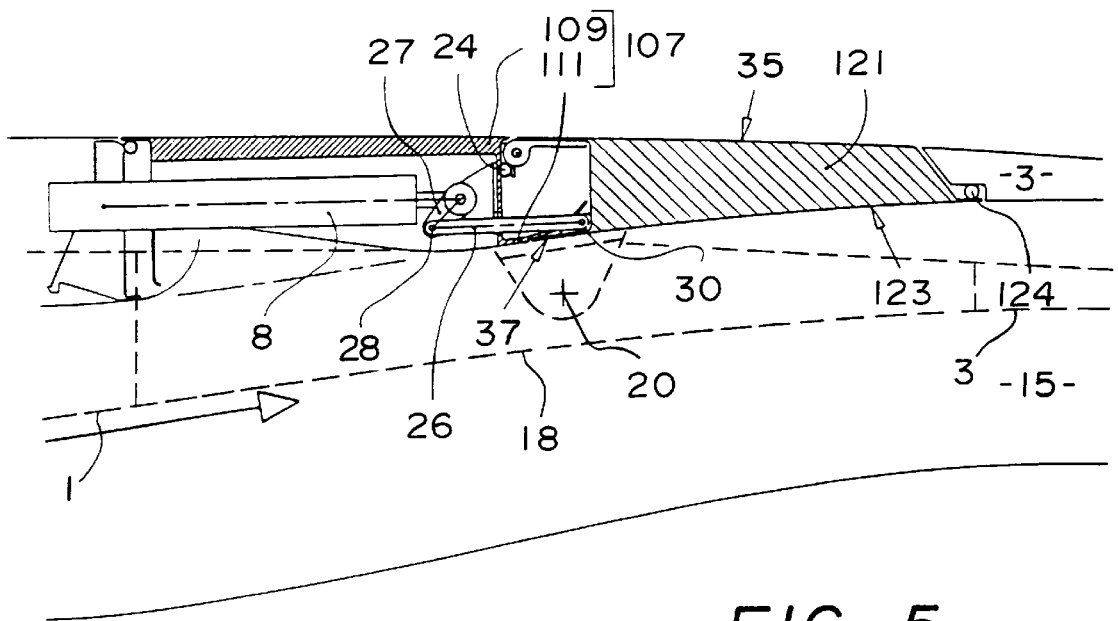
FIG. 5 is a partial, cross-sectional view of a second embodiment of the thrust reverser according to the present invention with the thrust reverser door assembly in the forward thrust position.
Figure 6:
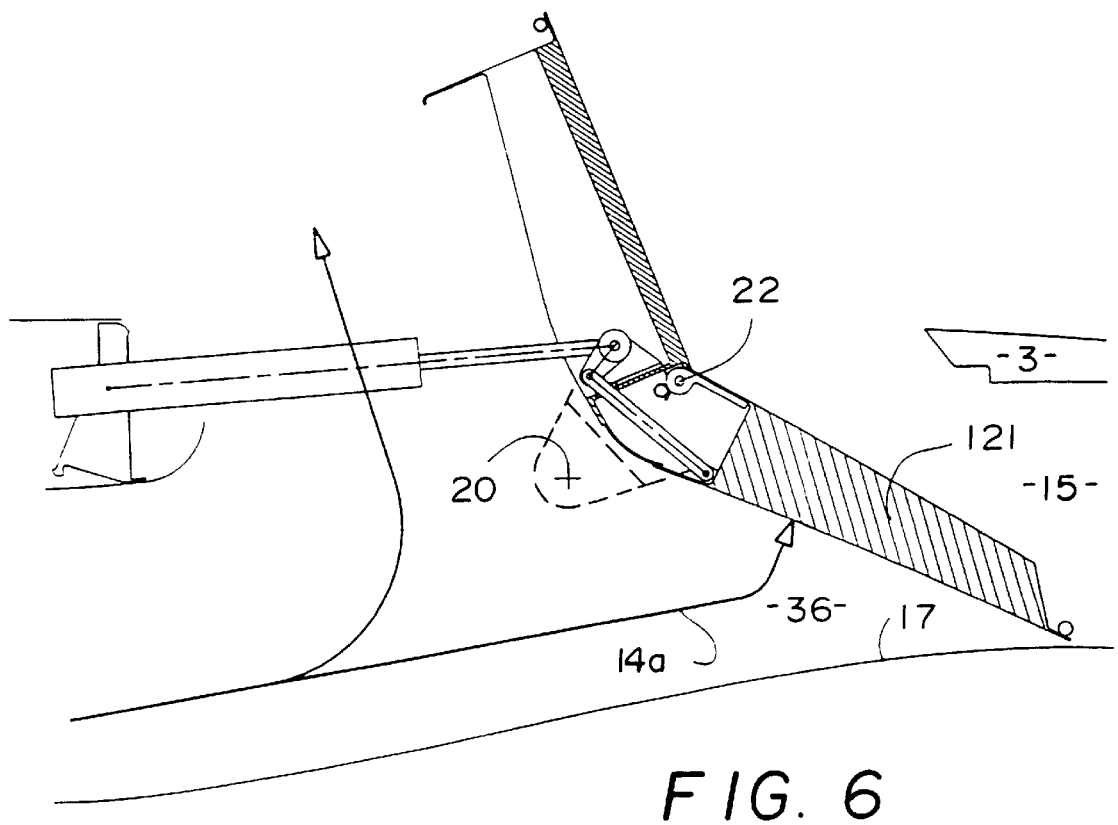
FIG. 6 is a partial, cross-sectional view similar to FIG. 5, but illustrating the thrust reverser door assembly in the reverse thrust position.

An alternative embodiment of the invention is illustrated at FIGS. 5 and 6. Rear door 121, an inner surface 123 and an outer surface 35 which is substantially flush with the outer surface of cowling 1 when the thrust reverser door assembly 2 is in the forward thrust position as illustrated in FIG. 5. The front door 107 again has an inner surface 111 which forms a portion of the outer boundary of the gas flow duct 15 when the door is in the forward thrust position, and an outer surface 109 that is substantially flush with the outer surface cowling 1 and the outer surface 35 of the rear door 121. Again, the door assembly pivots about axis 20 when moving between the forward thrust position and the reverse thrust position. Seal 24 is interposed between the front door 107 and the rear door 121 when the door assembly is in the forward thrust position, as illustrated in FIG. 5. Although the seal 24 is illustrated as being attached to the rear door 121, it is to be understood that it could also be attached to the front door 107 without exceeding the scope of this invention.

Again, the front door 107 is pivotally attached to rear door 121 by pivot 22, the axis of which may be parallel to axis 20. Seal 124 is interposed between rear cowling portion 3 and the rear edge of rear door 121.

The position of pivot 22 is determined such that, in the reverse thrust position illustrated in FIG. 6, a cavity 36 is formed between the inner surface 123 of rear door 121 and an surface of wall 17 to receive at least a portion 14a of the gases 14. As a result of the forces acting on the inner surface 123 by the pressurized gases 14a, the door assembly comprising the front door 107 and the rear door 121 will be urged toward the forward thrust position so as to positively prevent any inadvertent deployment of the door assembly to the reverse thrust position. The door assembly is self closing when in the forward thrust position by properly dimensioning the inner surface 123 of the rear door 121 such that the equilibrium position is preserved even if seal 24 should fail. In the forward thrust position, the pivot 22 may be either located to the front or to the rear of the pivot axis 20.

In the reverse thrust position, the angle between the rear door 121 and the wall 17 is determined in relation to the desired performance characteristics. In the forward thrust configuration, the front edge portion 37 of the rear door 121 either may be retracted, or it may project beyond the aerodynamic lines of the annular duct dependent upon the desired aerodynamic affects.

The invention may also be utilized in engine cowlings in which the rear is cowling portion 3 is omitted. In this instance, the rear door 121 will form the rear edge of the cowling.

In other variations of the invention, the rear door 121 may be pivotally attached to the cowling 1 so as to pivot about axis 20 instead of the front door 7, 107 being pivotally attached to the cowling as previously described. Also, the actuator 8 may act on the rear door 121 in which case, the attachment point of the linkrod 26 to the rear door 121 is located to the rear of the drive point for the front door 107.

In each of the aforedescribed embodiments, the mechanical connection between the rear door and the front door may be a separate actuator, instead of the linkrods 26. Also, linkrod 26 may be replaced by a resilient element, such as a spiral spring. Such a resilient element preferably imparts a pivoting force to the rear door 21, 121 relative to front door 7, 107, such that, when the door assembly is in the forward thrust position, the rear edge portion of the rear door, 21, 121 is in physical contact at one or more places with the rear cowling portion 3 which forms a stop. Means may also be present on the structure 3 to enable the stop to be adjustable. In the reverse thrust position, the rear edge portion of the rear door 21, 121 may contact one or more stops on the wall 17 within a predefined zone, dependent upon the selected kinematics. In such a case, as a function of the stresses produced at the contact between the rear door and the wall, assistance my be achieved in biasing the door assembly to the forward thrust position.

In another various, the rear end portion of the rear door 21, 121, may be connected by one or more linkrods to a front edge of the rear cowling portion 3 such that the rear door is moved into a retracted position when the door assembly is in the reverse thrust position.

The foregoing description is provided for illustrative purposes only and should not be construed as any way limiting this invention, the scope of which is defined by the appended claims.

We claim:

1. A thrust reverser for a turbojet engine having a cowling forming an outer boundary of a gas flow duct through which pressurized gases flow from a front toward a rear, the cowling having at least one reverse thrust opening therethrough, the thrust reverser comprising:

at least one thrust reverser door assembly pivotably attached to the cowling so as to be movable in a pivoting direction between a forward thrust position wherein the at least one thrust reverser door assembly covers the at least one reverse thrust opening to prevent gases in the duct from passing through the at least one reverse thrust opening, and a reverse thrust position wherein the at least one thrust reverser door assembly directs at least a portion of the gas flow in the duct through the reverse thrust opening, the at least one thrust reverser door assembly having a front door including a first front edge portion, a first rear edge portion and a first inner surface forming a portion of the outer boundary of the gas flow duct when the at least one thrust reverser door assembly is in the forward thrust position, and a rear door including a second front edge portion pivotally attached to the first rear edge portion of the front door such that the rear door pivots relative to the front door in a direction opposite to the pivoting direction of the at least one thrust reverser door assembly, a second rear edge portion which is free from attachment and a second inner surface forming a portion of the outer boundary of the gas flow duct when the at least one thrust reverser door assembly is in the forward thrust position such that the resultant force of the pressurized gases acting on the first and second inner surfaces urge the at least one thrust reverser door assembly toward the forward thrust position.

2. The thrust reverser of claim 1 wherein the cowling has an outer cowling surface and further comprising an outer surface on the front door that is substantially flush with the outer cowling surface when the at least one thrust reverser door assembly is in the forward thrust position.

3. The thrust reverser of claim 1 wherein the cowling has an outer cowling surface and further comprising an outer surface on the rear door that is substantially flush with the outer cowling surface when the at least one thrust reverser door assembly is in the forward thrust position.

4. The thrust reverser of claim 1, further comprising:

an actuator acting on the at least one thrust reverser door assembly to move the at least one thrust reverser door assembly between the forward and reverse thrust positions; and mechanical connection means connecting the front and rear doors so as to pivot the rear door relative to the front door in the direction opposite to the pivoting direction of the at least one thrust reverser door assembly as the at least one thrust reverser door assembly moves between the forward and reverse thrust positions.

5. The thrust reverser of claim 4 wherein the mechanical connection means comprises a linkrod attached to the actuator and to the rear door.

6. The thrust reverser of claim 5 wherein the linkrod passes through the rear edge portion of the front door and further comprising a seal sealing between the linkrod and the rear edge portion of the front door when the at least one thrust reverser door assembly is in the forward thrust position.

7. The thrust reverser of claim 5 wherein the actuator has a movable piston rod extending therefrom and wherein the linkrod is connected to the movable piston rod.

8. The thrust reverser of claim 5 wherein the linkrod is pivotally connected to the rear door.

9. The thrust reverser of claim 1 wherein the second rear edge portion of the rear door contacts the cowling when the at least one thrust reverser door is in the forward thrust position.

10. The thrust reverser of claim 9 further comprising a seal interposed between the second rear edge portion and the cowling when the at least one thrust reverser door is in the forward thrust position.

11. The thrust reverser of claim 1 further comprising a wall forming an inner boundary of the gas flow duct wherein the second inner surface of the rear door forms a cavity with the inner boundary wall to receive a portion of the gases therein when the at least one thrust reverser door assembly is in the reverse thrust position.

12. The thrust reverser of claim 1 further comprising a seal interposed between the first front edge portion of the front door and the cowling when the at least one thrust reverser door is in the forward thrust position.

* * * * *